US012622413B2

(12) United States Patent
Han

(10) Patent No.: US 12,622,413 B2
(45) Date of Patent: May 12, 2026

(54) PET WATER FILTER CARTRIDGE

(71) Applicant: Changqing Han, Beijing (CN)

(72) Inventor: Changqing Han, Beijing (CN)

( * ) Notice: Subject to any disclaimer, the term of this patent is extended or adjusted under 35 U.S.C. 154(b) by 393 days.

(21) Appl. No.: 18/401,822

(22) Filed: Jan. 2, 2024

(65) Prior Publication Data

US 2024/0158262 A1 May 16, 2024

Related U.S. Application Data

(63) Continuation of application No. PCT/CN2021/143947, filed on Dec. 13, 2021.

(51) Int. Cl.
| | |
|---|---|
| *A01K 7/02* | (2006.01) |
| *C02F 1/00* | (2023.01) |
| *C02F 1/28* | (2023.01) |
| *C02F 1/42* | (2023.01) |
| *C02F 103/20* | (2006.01) |

(52) U.S. Cl.
CPC ................ *A01K 7/02* (2013.01); *C02F 1/001* (2013.01); *C02F 1/281* (2013.01); *C02F 1/283* (2013.01); *C02F 1/42* (2013.01); *C02F 2103/20* (2013.01); *C02F 2201/002* (2013.01); *C02F 2201/006* (2013.01)

(58) Field of Classification Search
CPC . A01K 7/02; C02F 1/001; C02F 1/281; C02F 1/283; C02F 1/42; C02F 2103/20; C02F 2201/002; C02F 2201/006
See application file for complete search history.

(56) References Cited

U.S. PATENT DOCUMENTS

2020/0085010 A1    3/2020  Youn

FOREIGN PATENT DOCUMENTS

| CN | 304875774 S | 11/2018 |
|---|---|---|
| CN | 304875780 S | 11/2018 |
| CN | 109095634 A | 12/2018 |
| CN | 211861463 U | 11/2020 |
| KR | 20180138238 A | 12/2018 |

OTHER PUBLICATIONS

English translation Chinese Patent Publication No. CN 211861463 U (2020).*
English translation Chinese Design Patent No. CN 304875774 S (2018).*

* cited by examiner

*Primary Examiner* — John Kim
(74) *Attorney, Agent, or Firm* — JEEN IP LAW, LLC

(57) ABSTRACT

The present disclosure discloses a pet water filter cartridge, which specifically relates to the field of filtration technology for pet drinking water and aquatic aquaculture water, including a water filter cartridge carrier and a filter material. The water filter cartridge carrier is composed of a non-woven cotton hot pressed base and a non-woven cotton cover, the base is provided with an accommodation chamber. The accommodation chamber is provided with the filter material, the non-woven cotton cover is sealed at an opening of the accommodation chamber. The present disclosure directly uses non-woven cotton heat pressed filter cartridge carrier with various shapes, the entire filter cartridge is made of a filtering material. The materials used are all involved in water filtration, no excess plastic skeleton or trays are used as the filter cartridge carrier, which can reduce the pressure of emissions on the environment and be more environmentally friendly.

7 Claims, 4 Drawing Sheets

A-A

1

1

B-B

PET WATER FILTER CARTRIDGE

CROSS-REFERENCE TO RELATED APPLICATIONS

This application is a continuation of International Application No. PCT/CN2021/143947, filed on Dec. 31, 2021, which is hereby incorporated by reference in their entireties.

TECHNICAL FIELD

The present disclosure relates to the field of filtering of pet drinking water and aquaculture water technologies, and in particular, to a pet water filter cartridge.

BACKGROUND

The filtration of pet drinking water and aquaculture water mainly refers to the filtration of pet drinking water and aquaculture water for mammals, reptiles, birds, amphibians, etc. Its function is to soften water quality, sterilize, deodorize, improve pH value of water, and remove harmful substances from water.

All types of filter cartridges in the existing market have a skeleton made of injection molded parts or a tray structure formed by hot pressing as a carrier of the filter cartridge. At the same time, the filter material is processed into small filter material packages and manually placed on the carrier. Then, non-woven cotton is manually covered on the surface of the carrier to achieve packaging.

The existing technology has the following defects: firstly, the plastic skeleton or tray type carrier only serves as a structural support without any filtering effect; secondly, from a cost view, it occupies one-third of the cost of the filter cartridge, it is the largest cost of the filter cartridge; thirdly, the plastic skeleton or tray carrier, as the most important component, is also the least functional component, which results in high costs and material waste; fourthly, from a hygiene view, this type of filter material bag with a plastic skeleton is enclosed between the plastic shell and non-woven fabric, which can easily produce anaerobic protein substances on the surface, resulting in insufficient performance of the filter material, slow filtration effect, and difficult cleaning; and fifth, from a view of recycling waste and environmental protection, the non-woven fabrics and plastic skeletons are combined through hot pressing or ultrasound, thus, it is difficult to separate in households. The resulting waste is also the most difficult to handle and classify, which is not beneficial to the environment.

SUMMARY

Therefore, the present disclosure provides a pet water filter cartridge to solve the technical problems that may arise in the prior art.

In order to achieve the above objectives, the present disclosure provides the following technical solution: a pet water filter cartridge, including a water filter cartridge carrier and a filter material. The water filter cartridge carrier is composed of a non-woven cotton hot pressed base and a non-woven cotton cover. The base is provided with an accommodation chamber, the accommodation chamber is provided with the filter material, the non-woven cotton cover is sealed at an opening of the accommodation chamber.

In an embodiment of the present disclosure, a middle of the base is provided with a positioning hole.

In an embodiment of the present disclosure, the accommodation chamber in the base is multiple, the multiple accommodation chambers are evenly provided in the base.

In an embodiment of the present disclosure, the filter material is a bulk exchange resin, activated carbon or zeolite.

In an embodiment of the present disclosure, the non-woven cotton cover is sealed at the opening of the accommodation chamber by hot pressing or ultrasonic sealing.

In an embodiment of the present disclosure, the base is in a shape of a disc.

The present disclosure has the following advantages:

1. Non-woven cotton hot pressed of filter cartridge carriers with various shapes are used in the present disclosure and the entire filter is made of a filtering material. The materials used are all involved in water filtration, and the main filtering materials are directly used in the filter cartridge carrier. After the water passes through the first layer of filtering cotton, larger substances are filtered out, and then the filtering material can be directly impacted in sufficient space, the filtering material is caused to rotate and move in the water, thus fully exerting its function, and a fast-filtering effect is achieved. The filter cartridge can be easily and quickly cleaned of dirt on the surface of the filter cartridge and filter material without the constraints of the filter material package. No excess plastic frames and trays are used as the filter cartridge carriers, which can reduce the pressure of emissions on the environment, rendering it more environmentally friendly.

Numeral reference: 1. Filter material, 2. Base, 3. Non-woven cotton cover, 4. Accommodation chamber, 5. Positioning hole.

DESCRIPTION OF EMBODIMENTS

The following are specific embodiments to illustrate the implementation modes of the present disclosure. Those familiar with this technology can easily understand the other advantages and effects of the present disclosure from the content disclosed in this specification. Obviously, the described embodiments are a part of the embodiments of the present disclosure, not all of them. Based on the embodiments in the present disclosure, all other embodiments obtained by ordinary technical personnel in this field without creative work fall within the protection scope of the present disclosure.

Figure 1:
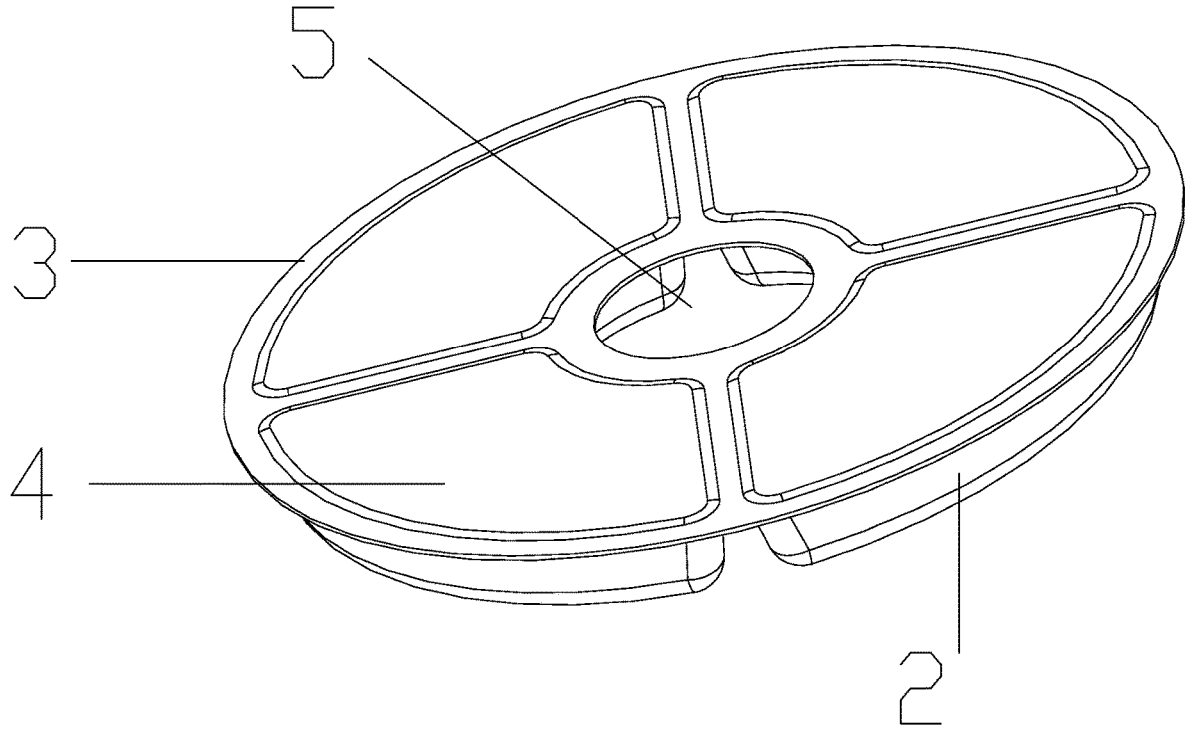
FIG. 1 is a schematic diagram of an overall structure of the present disclosure.
Figure 2:
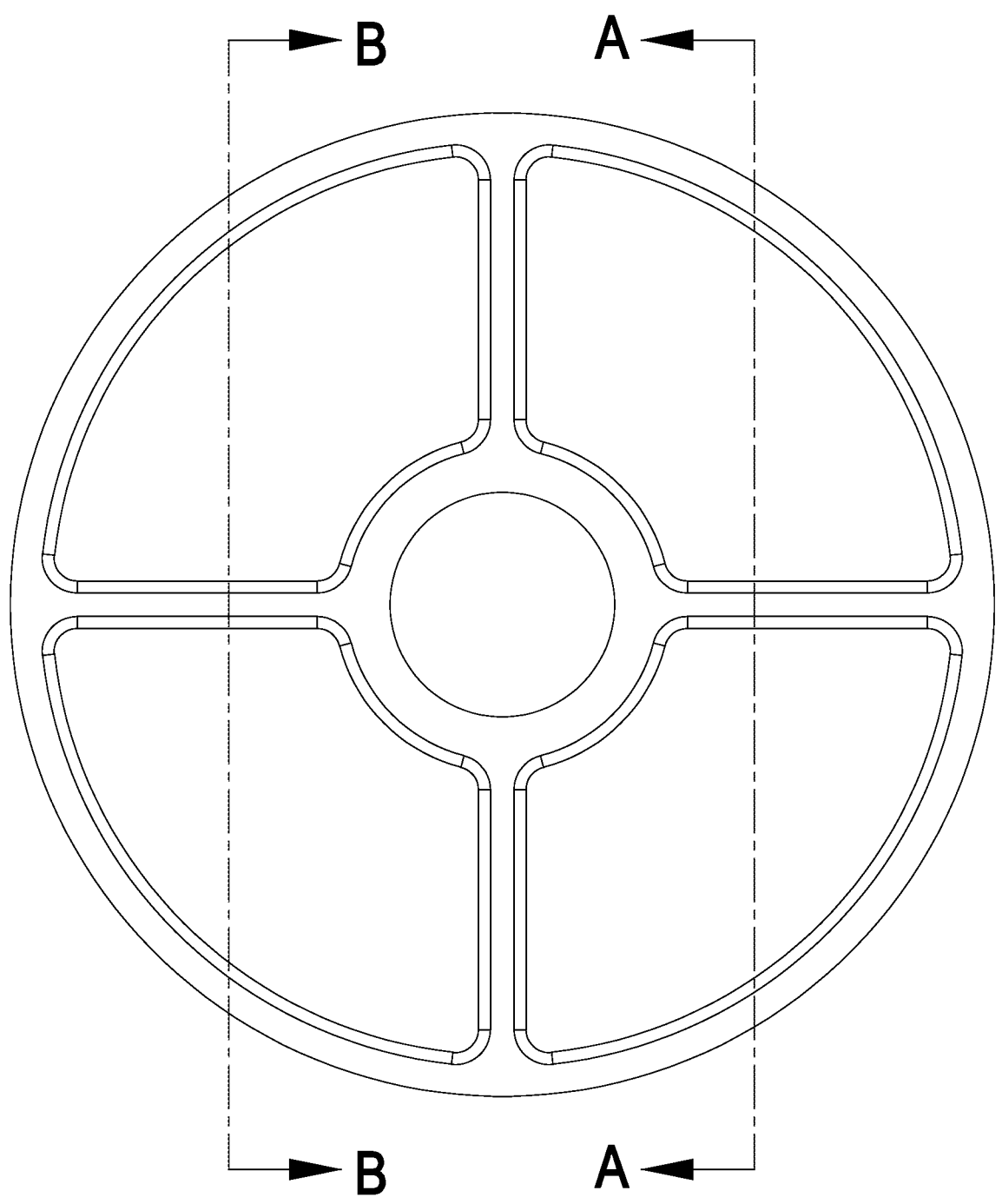
FIG. 2 is a front view of the present disclosure.
Figure 3:
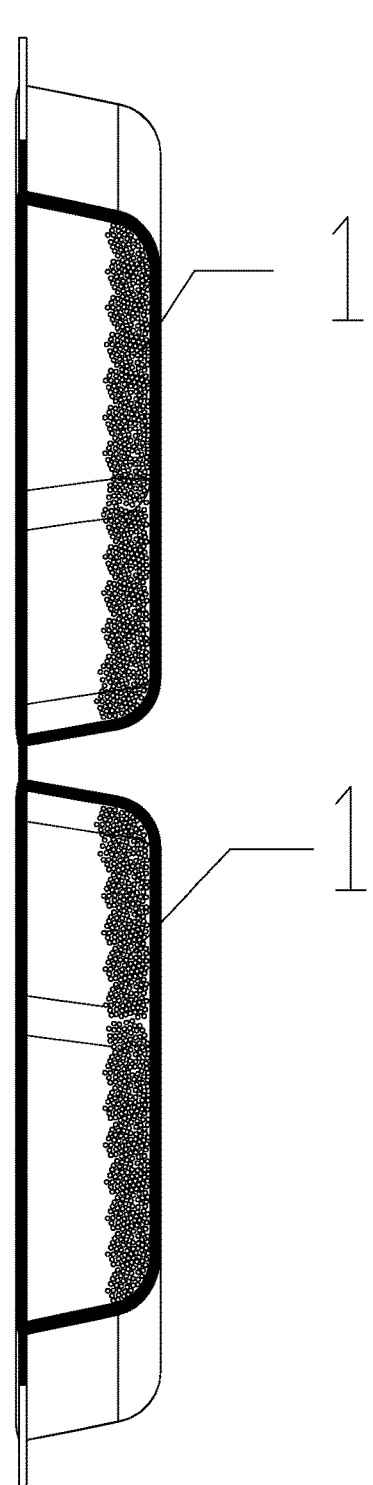
FIG. 3 is a sectional view in A-A direction of FIG. 2.
Figure 4:
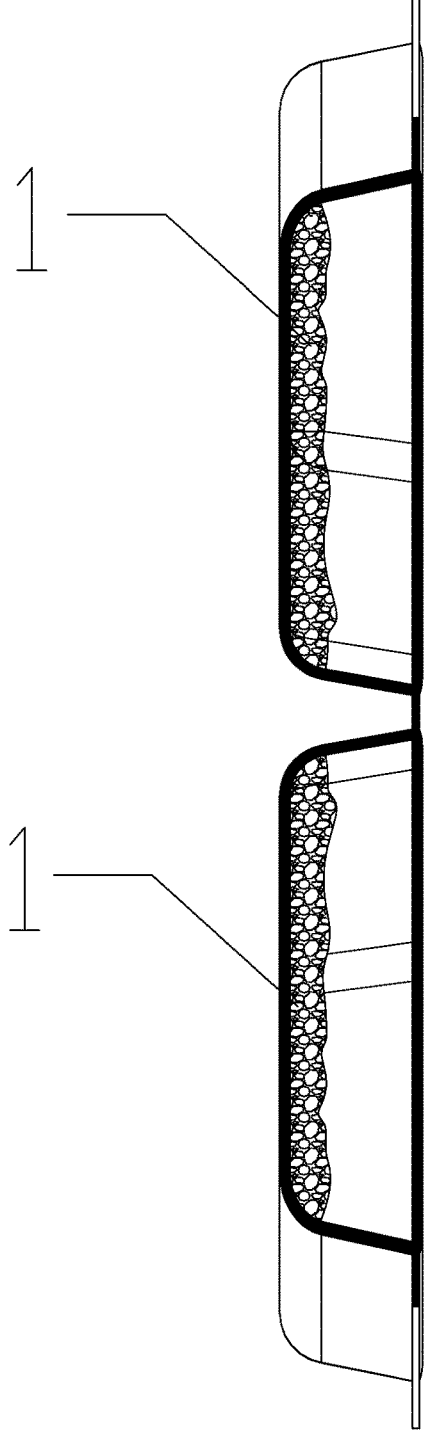
FIG. 4 is a sectional view in B-B direction of FIG. 2.

Referring to FIGS. 1-4 of the description, a pet water filter cartridge of this embodiment, including a water filter cartridge carrier and a filter material 1. The water filter cartridge carrier is composed of a non-woven cotton hot pressed base 2 and a non-woven cotton cover 3. The base 2 is in a shape of a disc, but it can also be designed in other shapes according to an actual condition, such as square. The base 2 is provided with an accommodation chamber 4, the accommodation chamber 4 is provided with the filter material 1. The non-woven cotton cover 3 is sealed at an opening of the accommodation chamber 4.

For a convenience of automated processing and packaging, a middle of the base 2 of the present disclosure is provided with a positioning hole 5.

For a convenience of improving a purification effect, the base 2 of the present disclosure is provided with multiple accommodation chambers 4, the multiple accommodation chambers 4 are evenly arranged in the base 2. Each chamber can be filled with a corresponding filter material according to an actual need.

For a convenience of improving the purification effect, the filter material 1 of the present disclosure is a bulk exchange resin, activated carbon or zeolite as the filter material. Of course, other filter materials can also be used according to an actual need.

To improve a production efficiency, the non-woven cotton cover 3 of the present disclosure is sealed at the opening of the accommodation chamber 4 through hot pressing or ultrasonic sealing.

The working principle of the present disclosure is that the plastic parts are eliminated and heat pressed non-woven cotton of filter cartridge with various shapes are directly use used. Bulk filter material is directly placed in the filter cartridge carrier, and then the non-woven cotton is covered on a top of the carrier for hot pressing or ultrasonic sealing. When in use, the water that needs to be purified is passed through the pet water filter cartridge of the present disclosure. The water that needs to be purified is first purified through the non-woven cotton cover, and then directly comes into contact with the filter material in the filter cartridge, greatly improving the filtration efficiency. At the same time, there is no restriction of a sealed material package, which overcomes the problem of easy breeding of anaerobic bacteria and other proteins. In addition, plastic parts are eliminated, thereby reducing the variety of materials, while saving costs, and greatly improving the difficulty of garbage collection and classification.

Although the present disclosure has been described in detail with general explanations and specific embodiments in the previous description, some modifications or improvements can be made based on the present disclosure, which is obvious to those skilled in the art. Therefore, these modifications or improvements made on the basis of not deviating from the spirit of the present disclosure belong to the protection scope claimed by the present disclosure.

What is claimed is:

1. A pet water filter cartridge, comprising a water filter cartridge carrier and a filter material (1), wherein the water filter cartridge carrier is composed of a non-woven cotton hot pressed base (2) and a non-woven cotton cover (3); the base (2) is provided with an accommodation chamber (4), the accommodation chamber (4) is provided with the filter material (1), the non-woven cotton cover (3) is sealed at an opening of the accommodation chamber (4).

2. The pet water filter cartridge according to claim 1, wherein a middle of the base (2) is provided with a positioning hole (5).

3. The pet water filter cartridge according to claim 1, wherein the accommodation chamber (4) in the base (2) is multiple, the multiple accommodation chambers (4) are evenly provided in the base (2).

4. The pet water filter cartridge according to claim 2, wherein the accommodation chamber (4) in the base (2) is multiple, the multiple accommodation chambers (4) are evenly provided in the base (2).

5. The pet water filter cartridge according to claim 1, wherein the filter material (1) is a bulk exchange resin, activated carbon, or zeolite.

6. The pet water filter cartridge according to claim 1, wherein the non-woven cotton cover (3) is sealed at the opening of the accommodation chamber (4) by hot pressing or ultrasound sealing.

7. The pet water filter cartridge according to claim 1, wherein the base (2) is in a shape of a disc.

\* \* \* \* \*